United States Patent
Chinn et al.

(10) Patent No.: US 8,946,637 B2
(45) Date of Patent: Feb. 3, 2015

(54) COMPACT FIBER-BASED SCANNING LASER DETECTION AND RANGING SYSTEM

(75) Inventors: Stephen Chinn, Alexandria, VA (US); Lew Goldberg, Fairfax, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 1108 days.

(21) Appl. No.: 12/952,264

(22) Filed: Nov. 23, 2010

(65) Prior Publication Data
US 2014/0231647 A1 Aug. 21, 2014

(51) Int. Cl.
- G01J 5/20 (2006.01)
- G01S 17/10 (2006.01)
- G01S 17/89 (2006.01)
- G01S 7/481 (2006.01)
- G01S 7/486 (2006.01)

(52) U.S. Cl.
CPC ............ *G01S 17/10* (2013.01); *G01S 17/89* (2013.01); *G01S 7/4812* (2013.01); *G01S 7/4817* (2013.01); *G01S 7/4818* (2013.01); *G01S 7/486* (2013.01)
USPC ...................................................... 250/338.4

(58) Field of Classification Search
USPC ....................................................... 250/338.4
See application file for complete search history.

(56) References Cited

U.S. PATENT DOCUMENTS

| | | | | |
|---|---|---|---|---|
| 4,266,851 A * | 5/1981 | Salisbury | ........................ | 385/39 |
| 4,303,302 A | 12/1981 | Ramsey et al. | | |
| 5,420,688 A | 5/1995 | Farah | | |
| 5,727,098 A * | 3/1998 | Jacobson | ........................ | 385/31 |
| 6,485,413 B1 | 11/2002 | Boppart et al. | | |
| 7,064,817 B1 * | 6/2006 | Schmitt et al. | ........... | 356/139.03 |
| 8,153,978 B1 * | 4/2012 | Scott et al. | ............... | 250/339.02 |
| 2002/0110077 A1 * | 8/2002 | Drobot et al. | ............ | 369/112.27 |
| 2005/0018715 A1 * | 1/2005 | Varshneya et al. | ................ | 372/6 |
| 2007/0002435 A1 * | 1/2007 | Ye et al. | ........................ | 359/368 |

OTHER PUBLICATIONS

X. Liu et al, "Rapid-scanning forward-imaging miniature endoscope for real-time optical coherence tomography," Optics Letters, vol. 29, No. 15, pp. 1763-1765, 2004.

D. A. Roberts and R. R. A. Syms, "1D and 2D laser line generation using a fibre optic resonant scanner," SPIE vol. 4075, pp. 62-73, 2000. http://spie.org/x648.html?product_id=397936.

(Continued)

*Primary Examiner* — David Porta
*Assistant Examiner* — Edwin Gunberg
(74) *Attorney, Agent, or Firm* — Richard J. Kim

(57) ABSTRACT

A system for short-range laser detection and ranging of targets can provides rapid three-dimensional, e.g., angle, angle, range, scans over a wide field-of-view. Except for the final transmit/receive lens, the disclosed LADAR system can be implemented in an all-fiber configuration. Such system is compact, low cost, robust to misalignment, and lends itself to eye-safe operation by making use of available pulsed 1550 nm fiber lasers and amplifier sources. The disclosed LADAR system incorporates many novel features that provide significant advantages compared to current LADAR systems. The disclosed system uses a monostatic fiber-based transmitter/receiver, a fiber beam scanner based on a laterally vibrating fiber, and a position sensor to monitor the transmitted beam position.

18 Claims, 4 Drawing Sheets

(56) References Cited

OTHER PUBLICATIONS

H. J. Woltring, "Single- and Dual-Axis Lateral Photodetectors of Rectangular Shape," IEEE Transactions on Electron Devices, vol. ED 22, pp. 581-590, 1975. http://ieeexplore.ieee.org/search/freesrchabstract.jsp?tp=&arnumber=147801&queryText%3DH.+J.+Woltring%2C+.QT.Single-+and+Dual-Axis+Lateral+Photodetectors+of+Rectangular+Shape%2C.QT.+IEEE+Transactions+on+Electron+Devices%2C+Vol.+ED+22%2C+pp.+581-590%2C+1975.%26openedRefinements%3D*%26searchField%.

SiTek Electro Optics AB; Partille, Sweden, "SPC-PSD High Linearity Position Sensing Detector with Signal Processing Circuit". http://www.sitek.se/pdf/psd/52-0245_Datablad-A.pdf.

R. Salem and T. E. Murphy, "Polarization-Insensitive Cross-Correlation Using Two-Photon Absorption in a Silicon Photodiode," Optics Letters, vol. 29, No. 13, pp. 1524-1526, 2004. http://www.photonics.umd.edu/pubs/journalarticles/JA-10/polarization-tpa.pdf.

R. Salem and T. E. Murphy, "Broadband Optical Clock Recovery Using Two-Photon Absorption," IEEE Photon. Technology Letters, vol. 16, No. 9, pp. 2141-2143, 2004. http://www.photonics.umd.edu/pubs/journal-articles/JA-11/ clock-recovery.pdf.

* cited by examiner

Angular scan pattern, 5x9°

COMPACT FIBER-BASED SCANNING LASER DETECTION AND RANGING SYSTEM

GOVERNMENT INTEREST

The invention described herein may be manufactured, used, sold, imported, and/or licensed by or for the Government of the United States of America.

FIELD OF THE INVENTION

This invention relates in general to laser detection and ranging, and more particularly, to fiber-based scanning laser detection.

BACKGROUND OF THE INVENTION

A typical method of operation for laser detection and ranging (LADAR) is to emit a short (~ns) optical pulse in a narrow beam and detect its reflected return from a target. The time delay between emission and detection provides the range to the target, and knowledge of the transmitted beam angle/direction provides target bearing information. The transmitted beam is collimated to provide low divergence to the target. In general, the target will reflectively scatter the incident beam into a large solid angle, so the amount of reflected power detected at the LADAR system will be proportional to the area of the receiver aperture. If the transmitted and received beams share a common aperture the system is described as monostatic. This type of system is insensitive to the misalignment and parallax problems common to LADARs which have separate transmit and receive apertures (described as bistatic). In monostatic operation, an optical means is provided for separating the transmitted and received beams before the aperture, so that the transmitted beam does not lose energy or degrade the operation of the photodetector, and the received intensity is directed primarily to the photodetector. In principle, this optical diplexing function might be as simple as a beam-splitter (which has excessive round-trip optical loss or more complex (such as a non-reciprocal optical circulator). In both cases (as in the bistatic system), careful alignment of the optical components must be performed during the assembly to assure that the narrow FOV of the small photo detector used as the high bandwidth receiver is aligned (in angle) with the transmitted beam.

To gather three-dimensional imagery for such a narrow-beam, single-detector system, the transmit/receive (TX/RX) direction must be moved or scanned over the desired field-of-view. This task is typically achieved using mechanical scanners such as rotating polygon mirrors, galvanometer scanner mirrors, or piezo-electrically scanned mirrors. These scanning techniques suffer from high cost, large volume and weight, and/or limited scanning speed and angle. An alternate method for implementing a LADAR system is to flood the entire field of view (FOV) with the transmitted beam, and simultaneously detect the reflections over many pixels imaging that FOV. This mode of operation is referred to as "flash" LADAR, and requires higher energy laser pulses with a complex camera focal plane photo-detector array and readout circuit.

SUMMARY OF THE INVENTION

Various exemplary scanning LADAR systems having a narrow transmit beam and single photodetector are disclosed. Such an exemplary system can have a tower pulse energy than the flash LADAR, but a higher pulse repetition rate and a means of rapidly scanning the TX/RX direction so as to cover the desired FOY with sufficient spatial resolution in the required time.

A laser detection and ranging system is disclosed. Such an exemplary system comprises a fiber-based monostatic transmitter/receiver; a fiber beam scanner based on a laterally vibrating fiber cantilever; a transmit/receive lens to collimate a transmitted optical beam and receive optical pulses; and a position sensor to monitor a transmitted beam position and hence propagation angle of the transmitted collimated optical beam.

In another aspect, a monostatic laser detection and ranging system is disclosed. Such an exemplary system comprises a coupling diplexer output coupled to an output fiber; an optical source of transmit light coupled by a source fiber to said coupling diplexer; a detector/receiver coupled by a receiving fiber to said coupling diplexer to receive light; a fiber beam scanner based on a PZT fiber actuator to which a stripped portion of said output fiber is attached, wherein the PZT fiber actuator based fiber beam scanner acts as a cantilever to vibrate a fiber tip of said output fiber; a transparent position sensing detector; and a collimating transmit/receive lens. A small 5-20 μm diameter inner core of said output fiber is used to guide transmit light out through said fiber tip to the transmit/receive lens. A larger 90-100 μm diameter outer core of said output fiber guides the received light collected by the transmit/receive lens to said fiber tip.

Yet, in another aspect, a laser scanning system is disclosed based on an imaged absorption mode of position sensing detection. Such an exemplary system comprises a fiber beam scanner to guide images based on a laterally vibrating fiber cantilever having a fiber tip; a weak beam splitter to relay a split image by splitting an image from the fiber tip; a collimating transmit/receive lens to transmit a transmit image from the fiber tip; an imaging lens to image said relayed split image; and a position sensing detector to absorb said image from said imaging lens. Outputs from said position sensing detector are sampled per pulse to determine a position of said fiber tip and a corresponding beam angular direction.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
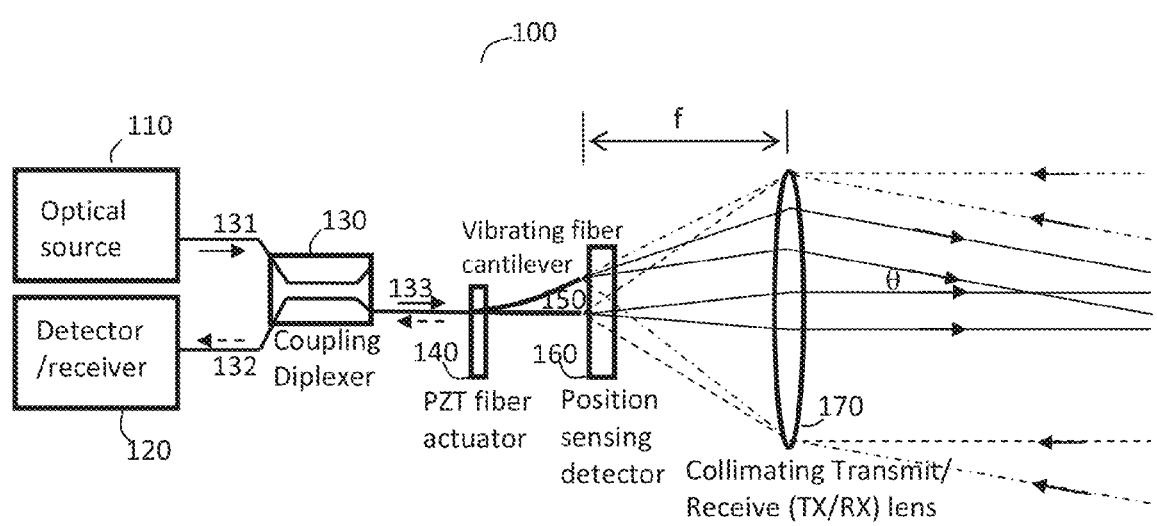
FIG. 1 shows a block diagram of an exemplary LADAR system.

An exemplary LADAR system 100, shown in FIG. 1, is based on the following functionalities: 1. Fiber-based monostatic transmitter/receiver, 2. Fiber beam scanner based on a laterally vibrating fiber cantilever (e.g., 140), 3. Position sensor (e.g., 160) to monitor the transmitted beam position and hence propagation angle of the transmitted collimated optical beam. These components and their interaction are detailed below.

Exemplary components of such an LADAR system 100 are an optical source 110, e.g., an eye-safe 1550 nm pulsed fiber laser or master oscillator-power-amplifier (MOPA), and a photo detector 120 for converting the received optical LADAR pulses into electrical signals that are processed by the receiver electronics to extract range information. The all-fiber MOPA incorporates a fiber laser that amplifies an optical seed pulse from a semiconductor laser diode, of a fiber-coupled type that is readily available as standard fiber telecommunications products. The pulse width and repetition rate (typically 1-10 ns and 10-50 kHz) are determined by the electronic circuit that provides current drive to the diode. At this wavelength, $Er^{3+}/Yb^{3+}$ co-doped fibers are used to provide optical gain. Optical pumping of $Yb^{3+}$ is typically near 930-960 nm where high power pump diodes are readily available. Multi-clad phosphate-glass fibers are commonly used, in which a large multi-mode fiber cladding region allows efficient pump coupling, that is absorbed in a smaller quasi-single-mode (Er, Yb)-doped core. Typical average optical power slope efficiencies 40-45% can be achieved, with corresponding overall electrical-to-optical conversion efficiency ~10-15%. A constraint on operation is that the peak power of an amplified pulse be low enough so that non-linear pulse degradation does not occur over the length of the fiber through which it propagates. If eye-safe wavelengths are not required, similar optical fibers having only $Yb^{3+}$ dopant can be used. Efficient optical gain is typically near 1040-1070 nm, and seed laser diodes with 1064 nm wavelength (to simulate $Nd^{3+}$: YAG) are available.

The photo detector (e.g., 120) can be an InGaAs APD or PIN diode with sufficient electrical bandwidth to allow desired range accuracy. Electrical amplification of the signal generated by the photodiode brings the signals to voltage levels sufficient for processing. Simple threshold detection is sufficient for determining range information of the first return. More complete processing can be performed by continuous fast sampling of the return signal over a desired gate interval. High-rate samples allow for precise peak location, as well as detection of multiple weak returns from partially reflecting targets at several ranges.

1. The fiber configuration of an exemplary monostatic transmitter/receiver can be based on a coupling diplexer 130 coupled by fiber 131 to an optical source 110, fiber coupled 132 to a detector/receiver 120 and output coupled to a single fiber 133 to both launch the transmit light and also to collect the returned light from the common TX/RX lens 170 at the aperture. For example, a small (typically 5-20 μm diameter) inner core of output fiber 133 can be used to guide transmit light out to the TX/RX tens 170, and a larger (90-100 μm diameter) outer core of said output fiber 133 to guide the received light collected by the TX/RX lens 170. The fiber 133 cat be a multi-core fiber comprised of the inner core with a refractive index an outer core that surrounds the inner core with a refractive index $n_2 < n_1$, and an outer cladding layer that surrounds the outer core and has a refractive index $n_3 < n_2 < n_1$. Because the inner core and the outer are concentric, at the fiber tip 150 they are automatically aligned with respect to the common monostatic TX/RX lens 170 for any position of the fiber tip 150 in the focal plane of the lens. See, e.g., copending U.S. patent application Ser. No. 12/942,385, Attorney Docket No. NVL 3335, entitled, "Compact Monostatic Optical Receiver and Transmitter," by Dr. Lew Goldberg, incorporated by reference.

The inner core of said output fiber 133 can have a small numeric aperture (NA) by having a low refractive index step at the inner-to-outer core boundary, while the outer core is designed to have a much higher NA, typically 0.2-0.5. Therefore, the TX beam (represented by solid rays in FIG. 1) divergence is low, typically corresponding to an NA=0.08-0.14, so that the TX beam does not fill the lens, which has a typical NA=0.3-0.5.

Received light is collected by the entire aperture of the lens 170 (represented by dashed rays in FIG. 1) and focused onto the fiber tip 150. The received light is focused by the lens 170 with a substantially higher NA than the transmitted light emanating from the fiber 150, Most of focused received light exceeding the NA of the core is not guided by it, but instead is captured and guided by the high numerical aperture outer core. The ratio of the power collected by the outer core to that of the inner core equals the square of the ratio of the respective NAs. For example, for an outer and inner cladding NA=0.3, and 0.1 respectively, 89% of the received light will couple into the outer core. In practice, the fraction of received light coupled into the outer cladding will be even larger because the aberrations of the fully illuminated lens aperture will cause the size of the focused spot to be substantially larger than the diameter of the inner core.

An important component of the monostatic TX/RX is the coupling diplexer 130 that allows the transmit light from the optical source 110 to propagate in the forward direction 131, and allows collected return light to propagate in backward direction 132 to the detector/receiver 120. An exemplary embodiment is based on an all-fiber diplexer 130; a fused fiber coupler 130 that allows light propagating in the outer core of the multi-core fiber (e.g., 133) to be coupled out and into to a second "tap" fiber (e.g., 132), without significantly perturbing the light propagating in the inner core. Such coupler (e.g., 130) can be constructed by first tapering the multi-core fiber (e.g., 133) to approximately half its diameter, and then fusing large core diameter "tap" fiber (e.g., 132) to the tapered section. With appropriate tapering of the multi-core fiber (e.g., 133), TX light remains confined to the inner core, and is transmitted through the diplexer (130) without significant loss. Received return LADAR light is adiabatically coupled into the tapered outer core and transferred to the larger tap fiber (e.g., 132) that is fused to the tapered section of the multi-mode fiber (e.g., 133). The fraction of power transferred into the tap fiber (e.g., 132) is approximately equal to the ratio of its cross-sectional area to the sum of its cross-sectional area and that of the tapered outer core of the multi-core fiber (e.g., 133). This all-fiber diplexer 130 has the advantage of simple, rugged construction that is compatible with the rest of the fiber-based system. An alternate diplexer can be based on miniature free space optics.

2. An exemplary fiber beam scanner (e.g., 140) can be based on a small, inexpensive method of rapid beam scanning that takes advantage of the fiber-based optical sources (e.g., 110) and diplexer (e.g., 130) portions of the LADAR optical system 100. If the tip of the output fiber 150 is translated by distance d in the output lens focal plane, the collimated beam is scanned by an angle θ=d/f, where f is the focal length of the lens system (as shown in FIG. 1).

Figure 2:
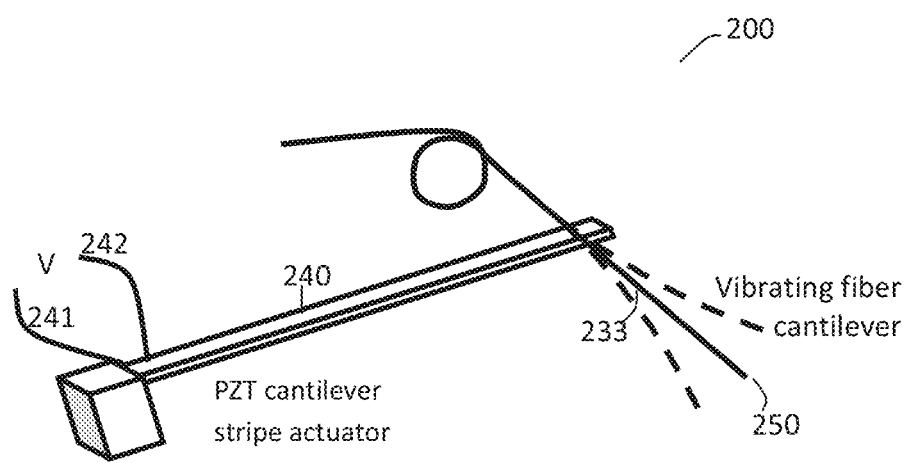
FIG. 2 shows exemplary fiber beam scanner.

As further exemplified in FIG. 2, rapid scanning of the fiber tip (e.g., 250) over millimeter displacements can be achieved by vibrating a short length of fiber cantilever (e.g., 233) at its resonant frequency (dependent on the fiber parameters and cantilever length). A simple method of implementing the fiber oscillation is to strip the polymer coating from a short length of output fiber (e.g., 133 or 233), and attach the bare fiber to a piezo-electric (PZT) stripe actuator (e.g., 140 or 240), a narrow element whose tip flexes with voltage applied to contacts (e.g., 241 and 242) at the other end of the stripe (e.g., 240). This is also a resonant cantilever structure (e.g., 200), so a sinusoidal voltage V applied to the actuator (e.g., 240) at its resonant frequency can give large displacements for small voltages. If both stripe e.g., 240) and fiber (e.g., 233) resonant frequencies are close, mechanically magnified fiber displacements of several mm can be achieved with less than 10VAC drive. For example, a typical PZT actuator 25 mm long, and a fiber cantilever 17.3 mm long have resonances near 300 Hz. Higher frequencies can be achieved with shorter cantilever lengths, at the cost of smaller displacements or higher drive voltages.

Figure 3A:
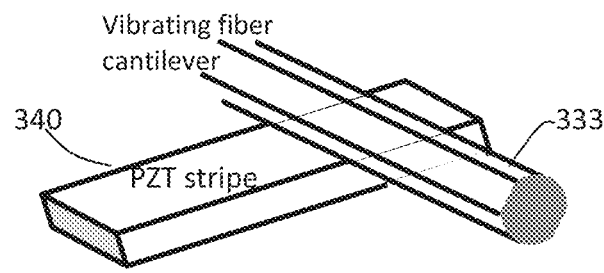
FIG. 3a shows an exemplary mounting of an asymmetric fiber on a PZT actuator for 2-dimensional scanning.

Alternatively, in addition to enabling one-dimensional scans, two-dimensional scans can be provided with only one fiber and PZT transducer. This requires that the fiber (e.g., 333), instead of having a round cross-section, have two orthogonal transverse axes of symmetry, with distinct second moments of area in the two directions. If the cantilever (e.g., 340) is mounted with these axes at, e.g., 45° to the PZT direction of motion, as shown in FIG. 3a, each axis will have a different resonant frequency that can be excited by a dual-frequency excitation applied to the transducer.

Figure 3B:
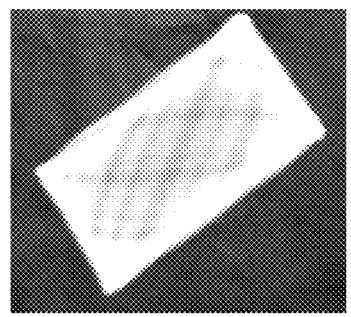
FIG. 3b shows an exemplary 5×9° angular scan pattern based on a 2-dimensional scanning.

The fiber length (e.g., 333) should be chosen so that the pair of fiber resonant frequencies brackets the PZT resonant frequency. Some resonance enhancement from the PZT will be lost, but if its resonance is midway between the fiber resonances, there will still be substantial mechanical amplification because the PZT resonance bandwidth is broader than the fiber's. The result is a rectangular-envelope quasi-Lissajous output scan (an example of a typical 2-D scan pattern is shown in FIG. 3b), whose details depend on the exact drive frequencies and phases. We have demonstrated this effect by using a multi-clad fiber whose preform was designed to give 121 µm diameter, with symmetrically flattened thickness in one direction of 100 µm. The measured fiber resonant frequencies for 17.3 mm length were 286 and 333 Hz, quite close to those calculated from the fiber geometry and physical properties. The scan pattern can be driven so that every angular pixel of the area to be scanned is covered in a short interval, typically much less than a second. This exemplary fiber scan method was first proposed (with a different type of non-resonant PZT transducer) for short-range bar code readers or simple laser bit map projection at visible wavelengths. For the LADAR application, the fiber resonance frequencies can be nearly relatively prime, to avoid having a sparse Lissajou pattern over short intervals.

3. Beam position sensing (e.g., 160, 460 or 461-463): Unlike conventional beam scanners, such as galvo-controlled mirrors, the simple exemplary fiber scanner has no intrinsic means of determining the beam position. Since the drive voltage actuates two sequential types of mechanical resonance, with generally non-commensurate excitation frequencies in the second instance, it would not be easy or prudent to rely on a calibration of instantaneous voltage to determine fiber position. One means of measuring the beam direction is to use a two-dimensional position sensing detector (PSD) of the lateral photodetector type. Such devices are commercially available, This detector provides continuous voltage outputs that give the X-Y coordinate of a localized optical spot on its large-area two-dimensional surface.

Figure 4A:
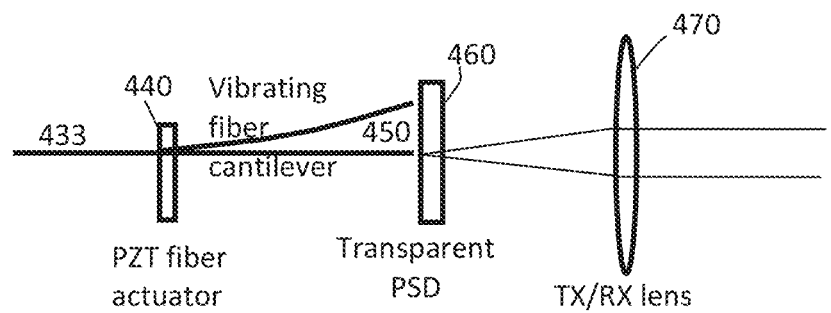
FIG. 4a shows an exemplary position sensing detector configuration based on a transparent PSD placed in direct beam path for position sensing.
Figure 4B:
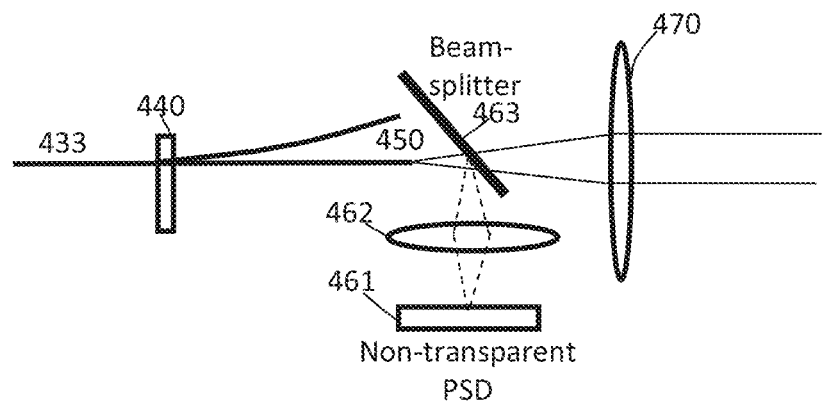
FIG. 4b shows an exemplary position sensing detector configuration based on a non-transparent PSD placed in an image plane of a lens for position sensing.

There are several possible alternative approaches to incorporating a PSD into an exemplary scanning system, as shown in FIGS. 4a and 4b, and described below:

(1) On exemplary embodiment is based on direct transmission mode as shown FIG. 4a, if the band-gap of the PSD semiconductor material exceeds the LADAR photon energy absorption by the PSD (e.g., 460) should be negligible. For short laser pulses with high peak power, however, two-photon absorption enables signal detection while allowing most of the energy to be transmitted (since only a small fraction of the light is converted to electron-hole pairs in the semiconductor). This allows the PSD (e.g., 460) to be placed in the direct path of the light emanating from the fiber tip (e.g., 450), in close proximity to the fiber where the spot size is still small. Absorption of the LADAR return signal back through the PSD will be also negligible. Standard silicon-based PSDs can be used with 1550 nm LADAR using two-photon absorption. For a given pulse energy and peak power, the electrical signal level generated by the PSD (e.g., 460) can be controlled by changing the distance between the fiber tip 450) and the PSD 460), thereby changing the optical intensity incident on the PSD. Since the photocurrent generated by the two-photon process is proportional to the square of the intensity, this method allows a large adjustment in the photo-sensitivity of the PSD. The advantages of this arrangement are its simplicity, since no other optical elements are required, and the low cost of Si PSDs.

(2) An alternative exemplary embodiment can be based on an imaged absorption mode, as shown in FIG. 4b. A relayed image of the fiber tip (e.g., 450) can be created with a weak beam-splitter (e.g., 463) and an imaging lens (e.g., 462). Two-photon absorption is possible in this geometry, or direct absorption could be used. With eye-safe 1550 nm operation, linear absorption would require a Ge- or InGaAs-based PSD. Shorter wavelengths (less than 1000 nm) will be strongly linearly absorbed by Si PSDs. In this case an auxiliary tow-power pilot beam at a wavelength less than 1000 nm could be injected into the single-mode core fiber (e.g., 433) to provide strong linear absorption in Si PSDs.

In pulsed LADAR operation, the PSD (e.g., 461) outputs would be sampled at each pulse to determine the fiber position and the corresponding beam angular direction. Depending on the type of amplification following the PSD, its pulse output signals may not maintain constant shape with position. However, in at least one example, we have observed that the integral of the pulse signal does accurately measure the linear position displacement. This sampled or integrated information could then be used to create a 3-D LADAR image of the observed scene.

Standard commercially-available data acquisition cards are available that can simultaneously process all four PSD outputs (to provide difference and sum signals for both coordinates.) The sum signals are used to normalize the difference signals, making them intensity independent. The same card can also directly drive the PZT actuator at the two fiber resonance frequencies, and provide synchronizing pulses for the laser and data acquisition process. A second, higher-sampling-rate, card, can be used to synchronously process the return pulse from the APD or PIN receiver to obtain its propagation delay and target range.

It is obvious that many modifications and variations of the present invention are possible in light of the above teachings. It is therefore to be understood that within the scope of the appended claims, the invention may be practiced otherwise than as described.

What is claimed is:
1. A laser detection and ranging system comprising:
  a fiber-based monostatic transmitter/receiver output coupled to a single fiber having an inner core to guide an optical beam for transmission in one direction and an outer core to guide received optical pulses in an opposite direction;

a fiber beam scanner having the single fiber at one end for coupling to the fiber-based monostatic transmitter/receiver output and a fiber tip for transmission at another end, wherein scanning is based on a laterally vibrating fiber cantilever actuated for resonant motion of the optical beam transmitted through the fiber tip;

a transmit/receive lens to collimate said transmitted optical beam as a transmitted collimated optical beam in one direction and receive optical pulses in an opposite direction as said received optical pulses; and a position sensor, wherein outputs from said position senor are sampled per pulse to monitor a transmitted beam position and hence propagation angle of the transmitted optical beam.

2. The system recited in claim 1, wherein said fiber-based monostatic transmitter/receiver includes an optical source having an eye-safe 1550 nm pulsed fiber laser or master oscillator-power-amplifier, and a photo detector for converting received optical pulses into electrical signals for processing by receiver electronics to extract range information.

3. The system recited in claim 2, wherein said optical source is based on a fiber laser that amplifies an optical seed pulse from a fiber-coupled semiconductor laser diode, wherein a pulse width and repetition rate are determined by an electronic circuit that provides current drive to the diode to be in the respective ranges of 1-10 ns and 10-50 kHz, and wherein $Er^{3+}/Yb^{3+}$ co-doped fibers are used to provide optical gain, wherein optical pumping of $Yb^{3+}$ is typically near 930-960 nm.

4. The system recited in claim 2, wherein multi-clad phosphate-glass fibers are used with a multi-mode fiber cladding region to allow pump coupling, wherein an optical gain is typically near 1040-1070 nm, and seed laser diodes have 1064 nm wavelength.

5. The system recited in claim 2, wherein the photo detector is an InGaAs APD or PIN diode.

6. A monostatic laser detection and ranging system, comprising:

a coupling diplexer output coupled to a proximal end of a single output fiber;

an optical source of transmit light coupled by a source fiber to a source end of said coupling diplexer to transmit light;

a detector/receiver coupled by a receiving fiber to a receiving end of said coupling diplexer to receive light from said proximal end of said single output fiber;

a fiber beam scanner based on a PZT fiber actuator to which a stripped portion of said output fiber is attached, wherein the PZT fiber actuator based fiber beam scanner acts as a cantilever to vibrate a fiber tip, wherein said fiber tip is a distal end of said single output fiber;

a transparent position sensing detector disposed to detect light transmitting from said fiber tip in vibration, wherein outputs from said transparent position sensing detector are sampled per an instant of output to monitor a transmitted beam position; and a collimating transmit/receive lens disposed to collimate light transmitted from said fiber tip in vibration through said transparent position sensing detector, wherein, a small 5-20 μm diameter inner core of said single output fiber is used to guide transmit light out through said fiber tip to the transmit/receive lens, and wherein a larger 90-100 μm diameter outer core of said output fiber guides the received light collected by the transmit/receive lens to said fiber tip.

7. The monostatic laser detection and ranging system recited in claim 6, wherein, the single output fiber is a multi-core fiber comprised of the inner core with a refractive index $n_1$, an outer core that surrounds the inner core with a refractive index $n_2<n_1$, and an outer cladding layer that surrounds the outer core and has a refractive index $n_3<n_2<n_1$, and wherein the inner core and the outer are concentric.

8. The monostatic laser detection and ranging system recited in claim 6, wherein the outer core has a numeric aperture value in the range of about 0.2-0.5.

9. The monostatic laser detection and ranging system recited in claim 6, wherein a received light is collected by the entire aperture of the transmit/receive lens and focused onto the fiber tip, the received light being focused by the transmit/receive lens.

10. The monostatic laser detection and ranging system recited in claim 6, wherein said coupling diplexer is based on a fused fiber coupler that allows light propagating in an outer core of a multi-core fiber to be coupled out and into to a second tap fiber, without significantly perturbing the light propagating in the inner core.

11. The monostatic laser detection and ranging system recited in claim 6, wherein said fiber beam scanner is capable of beam scanning based on said optical source and said coupling diplexer, wherein if the tip of the output fiber is translated by a distance d in the collimating transmit/receive lens focal plane, the collimated beam is scanned by an angle $\theta = d/f$, where f is the focal length of the lens system.

12. The monostatic laser detection and ranging system recited in claim 6, wherein said fiber beam scanner is capable of scanning of the fiber tip over millimeter displacements by vibrating a length of fiber cantilever at its resonant frequency, and is comprised of:

a piezo-electric stripe actuator based on a cantilever structure capable of flexing to resonate a distal end of the stripe with voltage applied to contacts at a proximal end of the stripe; and a bare fiber attached to said piezo-electric stripe actuator, wherein a polymer coating is stripped from a length of output fiber, wherein a sinusoidal voltage V applied to said contacts of the actuator at its resonant frequency provides resonant displacements of the fiber tip at the distal end.

13. The monostatic laser detection and ranging system recited in claim 6, wherein two-dimensional scans can be provided based on said fiber beam scanner, wherein said output fiber has a geometric cross-section having two orthogonal transverse axes of symmetry, with distinct second moments of area in two directions, such that when said PZT fiber actuator based fiber beam scanner is configured with the axes at a geometric offset angle to the PZT direction of motion, each axis has a respectively unique resonant frequency that can be excited by a dual-frequency excitation applied to a transducer of the PZT fiber actuator.

14. The monostatic laser detection and ranging system recited in claim 6, wherein said transparent position sensing detector is a silicon-based position sensing detector using two-photon absorption, wherein for a given pulse energy and peak power, the electrical signal level generated by the position sensing detector can be controlled by changing the distance between the fiber tip and the position sensing detector, thereby changing the optical intensity incident on the position sensing detector.

15. A laser scanning system based on an imaged absorption mode of position sensing detection, the system comprising:

a fiber beam scanner to guide images based on a laterally vibrating fiber cantilever having a fiber tip, wherein a single fiber has an inner core to guide transmission of an image from the fiber tip in a transmit direction and an outer core to guide reception of light in a receive direction;

a beam splitter to relay a split image by splitting an image transmitted from the fiber tip;

a collimating transmit/receive lens to transmit the image transmitted from the fiber tip in said transmit direction and receive light from the receive direction;

an imaging lens to image said relayed split image; and a position sensing detector to absorb said image from said imaging lens, wherein outputs from said position sensing detector are sampled per pulse to determine a position of said fiber tip and a corresponding beam angular direction.

16. The laser scanning system in claim 15, wherein a series of said sampled outputs contain linear position displacement information for 3-D LADAR imaging of an observed scene.

17. The laser scanning system in claim 15, wherein said position sensing detector absorption is by either two-photon absorption or direct absorption.

18. The laser scanning system in claim 15, wherein the position sensing detector is either Ge- or InGaAs-based to operate in an eye-safe transmission range.

* * * * *